United States Patent
Mashal (10) Patent No.: US 11,982,034 B2
(45) Date of Patent: May 14, 2024

(54) IMAGE QUALITY DETECTION FOR A CAMERA ASSEMBLY IN A LAUNDRY APPLIANCE

(71) Applicant: Haier US Appliance Solutions, Inc., Wilmington, DE (US)

(72) Inventor: Khalid Jamal Mashal, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 560 days.

(21) Appl. No.: 17/166,228

(22) Filed: Feb. 3, 2021

(65) Prior Publication Data

US 2022/0243377 A1 Aug. 4, 2022

(51) Int. Cl.

| | |
|---|---|
| *D06F 34/14* | (2020.01) |
| *D06F 23/02* | (2006.01) |
| *D06F 34/28* | (2020.01) |
| *D06F 37/26* | (2006.01) |
| *G06T 9/00* | (2006.01) |
| *D06F 103/04* | (2020.01) |
| *D06F 103/24* | (2020.01) |
| *D06F 105/54* | (2020.01) |
| *D06F 105/58* | (2020.01) |
| *G06T 7/00* | (2017.01) |
| *H04N 23/56* | (2023.01) |

(52) U.S. Cl.
CPC .............. *D06F 34/14* (2020.02); *D06F 23/02* (2013.01); *D06F 34/28* (2020.02); *D06F 37/266* (2013.01); *G06T 9/002* (2013.01); *D06F 2103/04* (2020.02); *D06F 2103/24* (2020.02); *D06F 2105/54* (2020.02); *D06F 2105/58* (2020.02); *G06T 7/0004* (2013.01); *G06T 2200/24* (2013.01); *G06T 2207/20084* (2013.01); *G06T 2207/30164* (2013.01); *G06T 2207/30168* (2013.01); *H04N 23/56* (2023.01)

(58) Field of Classification Search
CPC .......... D06F 23/02; D06F 34/14; D06F 34/28; D06F 37/266; D06F 2103/04; D06F 2103/24; D06F 2105/54; D06F 2105/58
See application file for complete search history.

(56) References Cited

U.S. PATENT DOCUMENTS

| | | | |
|---|---|---|---|
| 9,222,212 B2 * | 12/2015 | Johansson | ............... D06F 58/52 |
| 10,191,356 B2 | 1/2019 | Laroia | |
| 11,639,573 B2 * | 5/2023 | Ashrafzadeh | ........... D06F 58/30 68/12.02 |
| 2005/0196046 A1 * | 9/2005 | Hudnut | ............... A47L 15/4293 382/218 |
| 2019/0369031 A1 * | 12/2019 | Niikura | .............. G05B 23/0283 |
| 2019/0382941 A1 * | 12/2019 | Hwang | ................... D06F 33/36 |
| 2020/0063315 A1 | 2/2020 | Yoon | |

FOREIGN PATENT DOCUMENTS

WO    WO2020138564 A1    7/2020

* cited by examiner

*Primary Examiner* — Joseph L. Perrin
(74) *Attorney, Agent, or Firm* — Dority & Manning, P.A.

(57) ABSTRACT

A laundry appliance includes a basket that is rotatably mounted within a cabinet and that defines a chamber for receiving a load of clothes. A camera assembly is mounted within the cabinet for taking images of the chamber and a controller obtains an image of the chamber when the basket is empty and not rotating. The image is analyzed using an autoencoder neural network process to determine an image quality and a responsive action is implemented when an image quality drops below a quality threshold.

11 Claims, 6 Drawing Sheets

IMAGE QUALITY DETECTION FOR A CAMERA ASSEMBLY IN A LAUNDRY APPLIANCE

FIELD OF THE INVENTION

The present subject matter relates generally to camera assemblies for use in laundry appliances, or more specifically, to systems and methods for monitoring the image quality of images obtained by camera assemblies in laundry appliances.

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle of a washing machine appliance, a drain pump assembly may operate to discharge water from within sump.

It may be desirable for a washing machine or other laundry appliances to include a camera assembly for obtaining images from within the wash chamber. For example, images obtained by the camera assembly may be used to obtain useful information related to wash performance, such as load type, water level, out-of-balance conditions, or other visible conditions of a load. Notably, however, when cameras are positioned within a wash chamber, the camera lens might be exposed to water, detergent, steam, etc. and may have a tendency to collect dirt, soap scum, grime, or other contaminants after prolonged use. These undesirable contaminants will affect the quality of the images obtained by camera assembly and the usefulness of information obtained from those images.

Accordingly, a washing machine appliance including a camera assembly with features for improved performance would be desirable. More specifically, a method for improving the operation of a camera assembly by identifying the buildup of contaminants or deteriorated image quality would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a laundry appliance is provided including a basket rotatably mounted within the cabinet and defining a chamber configured for receiving of a load of clothes, a camera assembly mounted within the cabinet in view of the chamber, and a controller operably coupled to the camera assembly. The controller is configured to determine that the basket is not rotating, obtain an image of the chamber using the camera assembly, determine that the basket is empty, analyze the image using an autoencoder neural network process to determine an image quality, determine that the image quality has dropped below a quality threshold, and implement a responsive action in response to determining that the image quality has dropped below the quality threshold.

In another exemplary embodiment, a method of operating a laundry appliance is provided. The laundry appliance includes a basket rotatably mounted within a cabinet and defining a chamber configured for receiving of a load of clothes, and a camera assembly mounted within the cabinet in view of the chamber. The method includes determining that the basket is not rotating, obtaining an image of the chamber using the camera assembly, determining that the basket is empty, analyzing the image using an autoencoder neural network process to determine an image quality, determining that the image quality has dropped below a quality threshold, and implementing a responsive action in response to determining that the image quality has dropped below the quality threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 1:
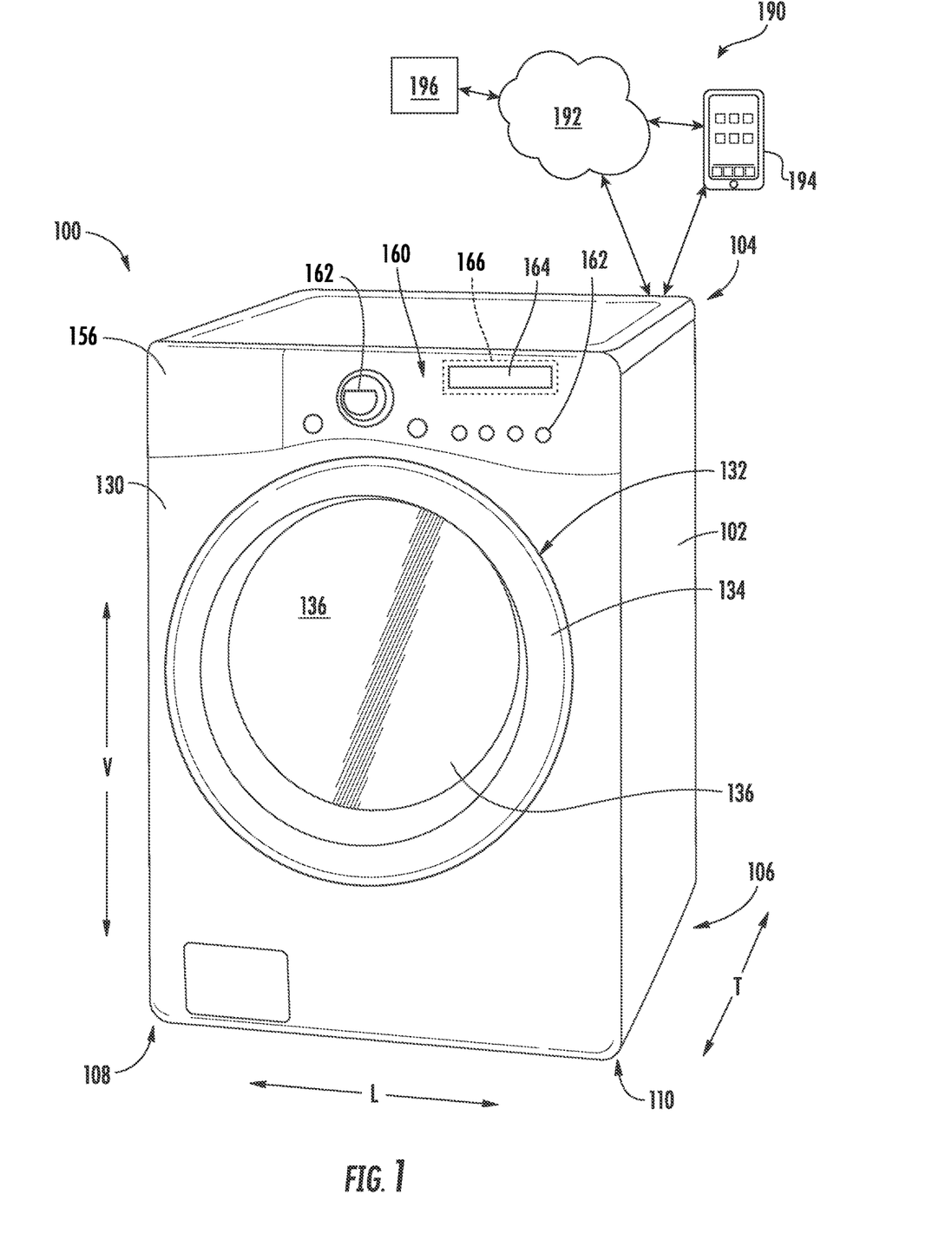
FIG. 1 provides a perspective view of an exemplary washing machine appliance according to an exemplary embodiment of the present subject matter.
Figure 2:
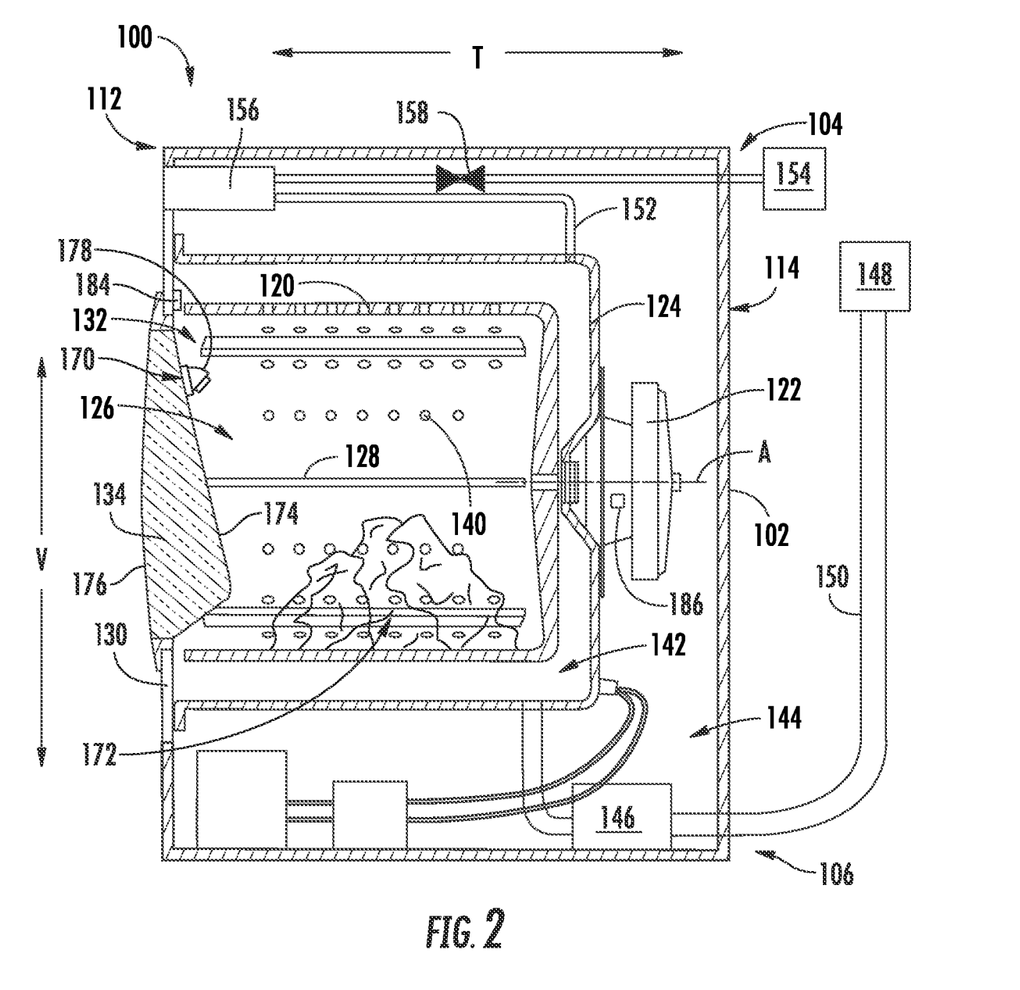
FIG. 2 provides a side cross-sectional view of the exemplary washing machine appliance of FIG. 1.

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction, and between a front 112 and a rear 114 along the transverse direction T.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

A spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users. Operation of washing machine appliance 100 is controlled by a controller or processing device 166 (FIG. 1) that is operatively coupled to control panel 160 for user manipulation to select washing machine cycles and features. In response to user manipulation of control panel 160, controller 166 operates the various components of washing machine appliance 100 to execute selected machine cycles and features.

Controller 166 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of washing machine appliance 100 may be in communication with controller 166 via one or more signal lines or shared communication busses.

During operation of washing machine appliance 100, laundry items are loaded into wash basket 120 through opening 132, and washing operation is initiated through operator manipulation of input selectors 162. Wash tub 124 is filled with water, detergent, and/or other fluid additives, e.g., via spout 152 and/or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through opening 132.

Figure 3:
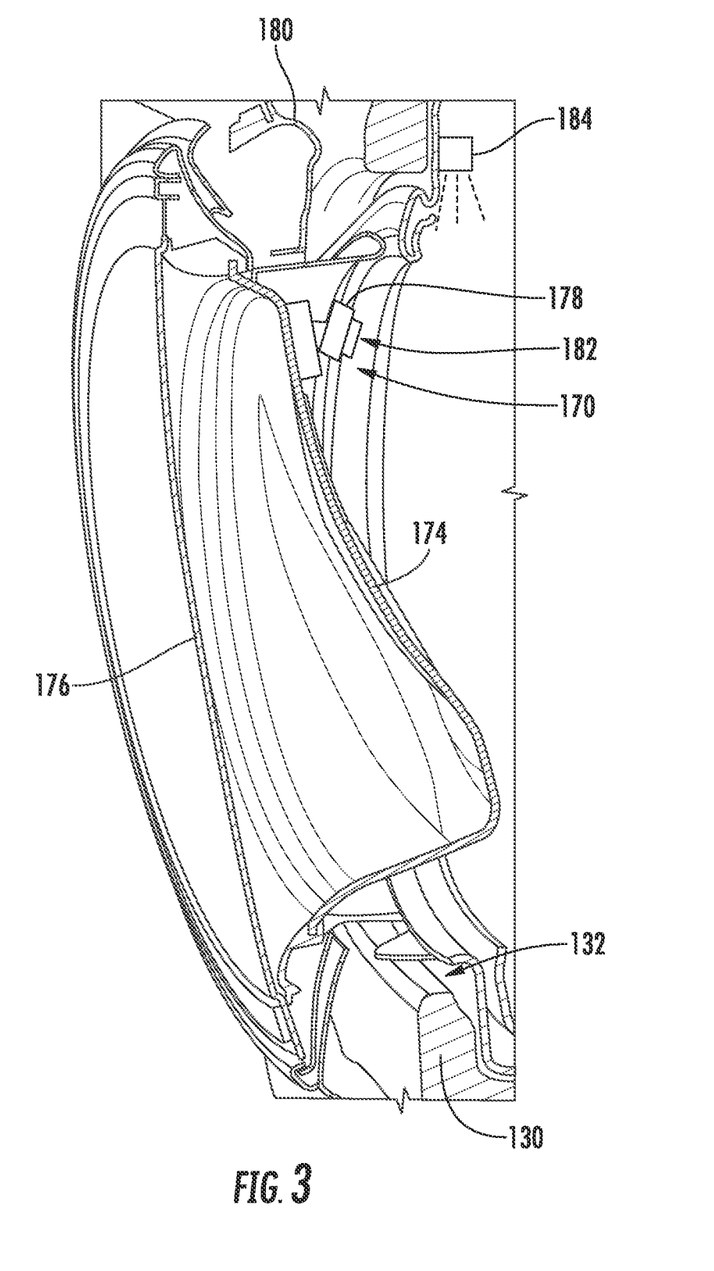
FIG. 3 provides a cross-sectional view of the exemplary washing machine appliance of FIG. 1 with a camera assembly mounted on a door according to an exemplary embodiment of the present subject matter.

Referring now specifically to FIGS. 2 and 3, washing machine appliance 100 may further include a camera assembly 170 that is generally positioned and configured for obtaining images of wash chamber 126 or a load of clothes (e.g., as identified schematically by reference numeral 172) within wash chamber 126 of washing machine appliance 100. Specifically, according to the illustrated embodiment, door 134 of washing machine appliance 100 comprises an inner window 174 that partially defines wash chamber 126 and an outer window 176 that is exposed to the ambient environment. According to the illustrated exemplary embodiment, camera assembly 170 includes a camera 178 that is mounted to inner window 174. Specifically, camera 178 is mounted such that is faces toward a bottom side of wash tub 124. In this manner, camera 178 can take images or video of an inside of wash chamber 126 and remains unobstructed by windows that may obscure or distort such images.

Figure 4:
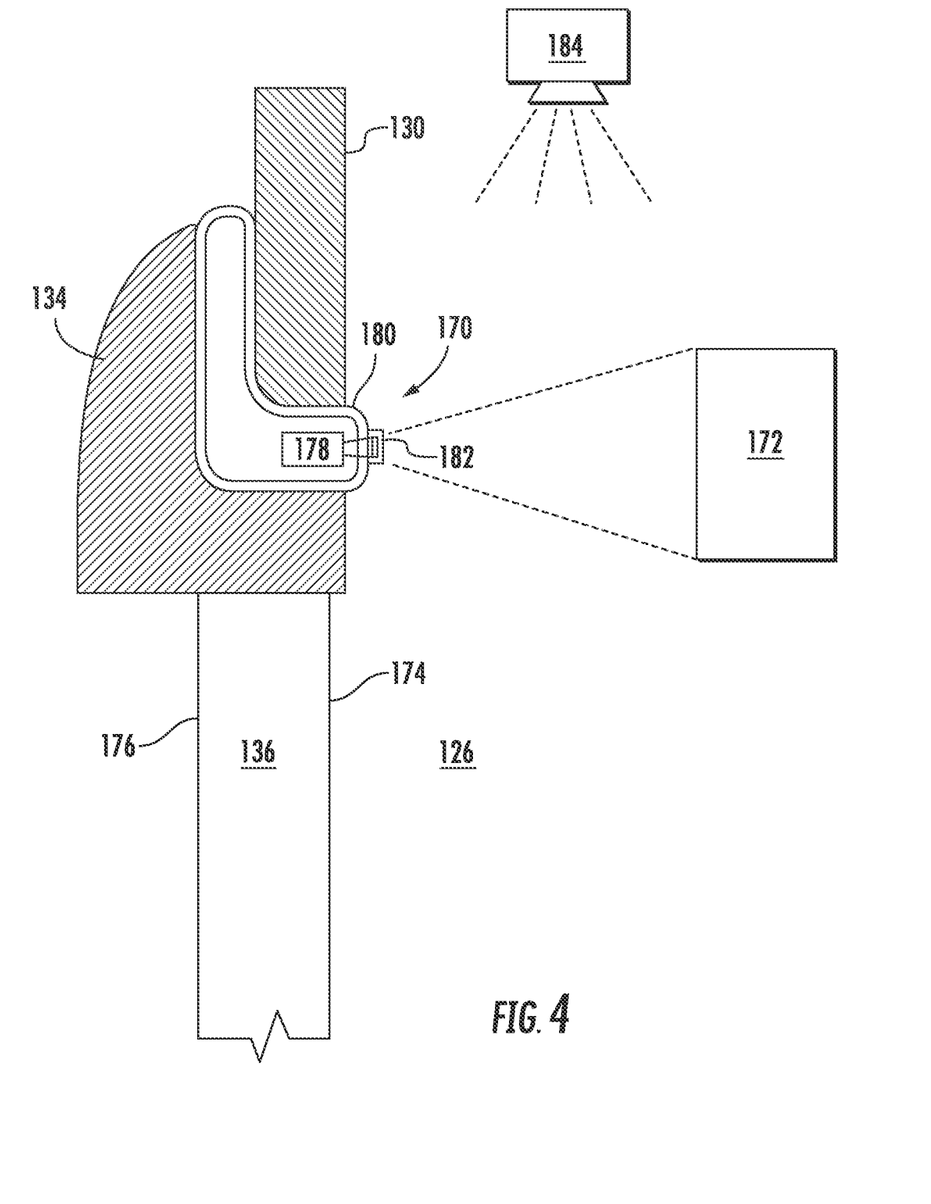
FIG. 4 provides a schematic view of a door and gasket sealed against a cabinet of the exemplary washing machine of FIG. 1, along with a camera mounted within the gasket according to an exemplary embodiment of the present subject matter.

Referring now briefly to FIG. 4, another installation of camera assembly 170 will be described according to an exemplary embodiment of the present subject matter. Due to the similarity between this and other embodiments, like reference numerals may be used to refer to the same or similar features. According to this exemplary embodiment, camera assembly 170 is mounted within a gasket 180 that is positioned between a front panel 130 of cabinet 102 and door 134. Although exemplary camera assemblies 170 are illustrated and described herein, it should be appreciated that according to alternative embodiments, washing machine appliance 100 may include any other camera or system of imaging devices for obtaining images of the load of clothes 172.

It should be appreciated that camera assembly 170 may include any suitable number, type, size, and configuration of camera(s) 178 for obtaining images of wash chamber 126. In general, cameras 178 may include a lens 182 that is constructed from a clear hydrophobic material or which may otherwise be positioned behind a hydrophobic clear lens. So positioned, camera assembly 170 may obtain one or more images or videos of clothes 172 within wash chamber 126, as described in more detail below. Referring still to FIGS. 2 through 4, washing machine appliance 100 may further include a tub light 184 that is positioned within cabinet 102 or wash chamber 126 for selectively illuminating wash chamber 126 and/or the load of clothes 172 positioned therein.

According to exemplary embodiments of the present subject matter, washing machine appliance 100 may further include a basket speed sensor 186 (FIG. 2) that is generally configured for determining a basket speed of wash basket 120. In this regard, for example, basket speed sensor 186 may be an optical, tactile, or electromagnetic speed sensor that measures a motor shaft speed (e.g., such as a tachometer, hall-effect sensor, etc.). According to still other embodiments, basket speeds may be determined by measuring a motor frequency, a back electromotive force (EMF) on motor 122, or a motor shaft speed in any other suitable manner. Accordingly, it should be appreciated that according to exemplary embodiments, a physical basket speed sensor 186 is not needed, as electromotive force and motor frequency may be determined by controller 166 without needing a physical speed sensor. It should be appreciated that other systems and methods for monitoring basket speeds may be used while remaining within the scope of the present subject matter.

Notably, controller 166 of washing machine appliance 100 (or any other suitable dedicated controller) may be communicatively coupled to camera assembly 170, tub light 184, basket speed sensor 186, and other components of washing machine appliance 100. As explained in more detail below, controller 166 may be programmed or configured for obtaining images using camera assembly 170, e.g., in order to detect certain operating conditions and improve the performance of washing machine appliance. In addition, controller 166 may be programmed or configured to perform methods to determine when the image quality of the images obtained by camera assembly 170 become degraded. When these images become degraded to a certain extent, controller 166 may implement responsive or corrective action, e.g., by notifying a user and/or initiating a lens cleaning process.

Referring still to FIG. 1, a schematic diagram of an external communication system 190 will be described according to an exemplary embodiment of the present subject matter. In general, external communication system 190 is configured for permitting interaction, data transfer, and other communications with washing machine appliance 100. For example, this communication may be used to provide and receive operating parameters, cycle settings, performance characteristics, user preferences, user notifications, or any other suitable information for improved performance of washing machine appliance 100.

External communication system 190 permits controller 166 of washing machine appliance 100 to communicate with external devices either directly or through a network 192. For example, a consumer may use a consumer device 194 to communicate directly with washing machine appliance 100. For example, consumer devices 194 may be in direct or indirect communication with washing machine appliance 100, e.g., directly through a local area network (LAN), Wi-Fi, Bluetooth, Zigbee, etc. or indirectly through network 192. In general, consumer device 194 may be any suitable device for providing and/or receiving communications or commands from a user. In this regard, consumer device 194 may include, for example, a personal phone, a tablet, a laptop computer, or another mobile device.

In addition, a remote server 196 may be in communication with washing machine appliance 100 and/or consumer device 194 through network 192. In this regard, for example, remote server 196 may be a cloud-based server 196, and is thus located at a distant location, such as in a separate state, country, etc. In general, communication between the remote server 196 and the client devices may be carried via a network interface using any type of wireless connection, using a variety of communication protocols (e.g. TCP/IP, HTTP, SMTP, FTP), encodings or formats (e.g. HTML, XML), and/or protection schemes (e.g. VPN, secure HTTP, SSL).

In general, network 192 can be any type of communication network. For example, network 192 can include one or more of a wireless network, a wired network, a personal area network, a local area network, a wide area network, the internet, a cellular network, etc. According to an exemplary embodiment, consumer device 194 may communicate with a remote server 196 over network 192, such as the internet, to provide user inputs, transfer operating parameters or performance characteristics, receive user notifications or instructions, etc. In addition, consumer device 194 and remote server 196 may communicate with washing machine appliance 100 to communicate similar information.

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more laundry appliances, other communication protocols and steps may be implemented, etc. These variations and modifications are contemplated as within the scope of the present subject matter.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances. In addition, aspects of the present subject matter may be utilized in a combination washer/dryer appliance. Indeed, it should be appreciated that aspects of the present subject matter may further apply to other laundry appliances, such a dryer appliance. In this regard, the same methods as systems and methods as described herein may be used to monitor an image quality of a camera assembly positioned in a chamber of the dryer.

Now that the construction of washing machine appliance 100 and the configuration of controller 166 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as vertical axis washing machine appliances. In exemplary embodiments, the various method steps as disclosed herein may be performed by controller 166 or a separate, dedicated controller.

Figure 5:
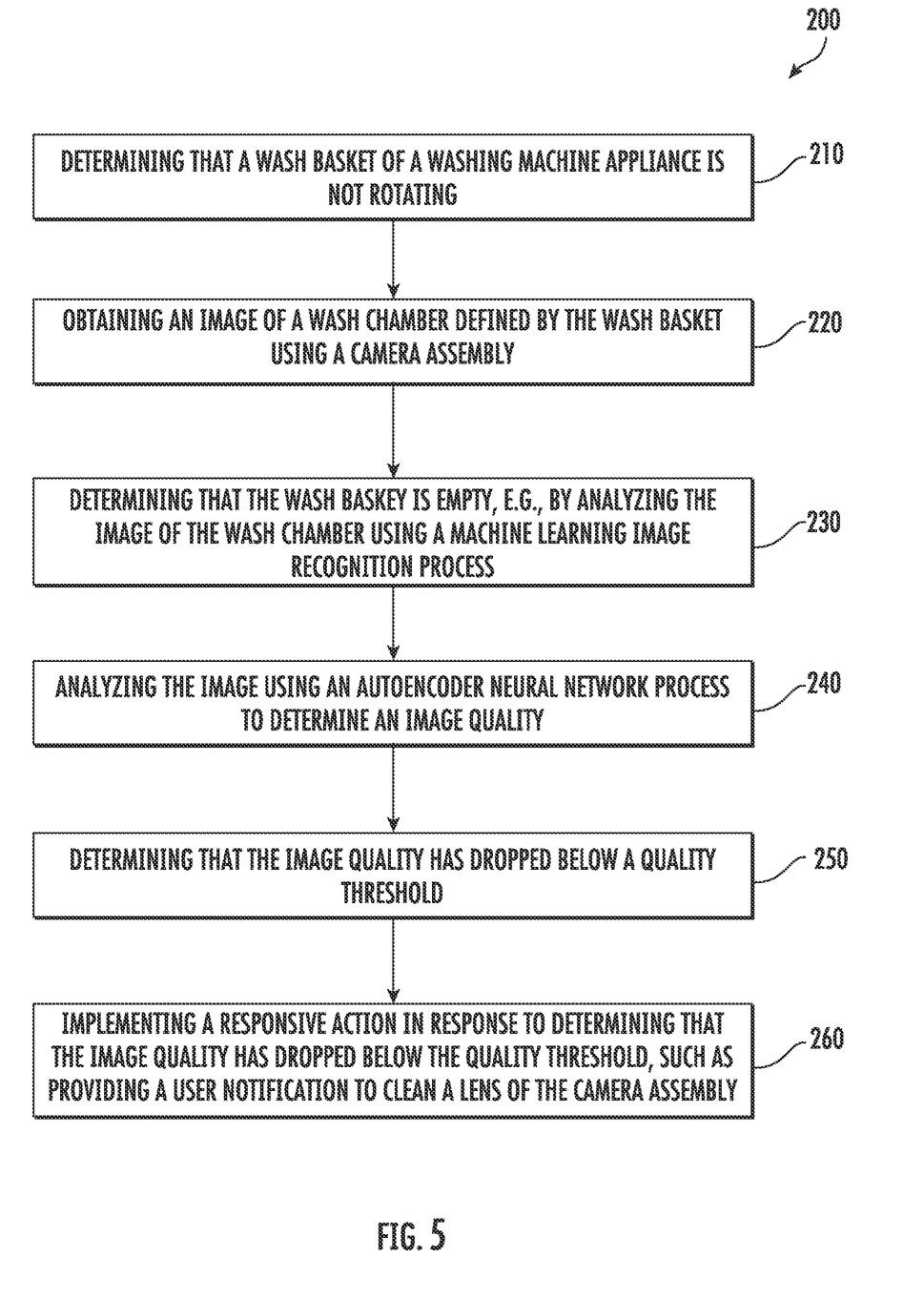
FIG. 5 illustrates a method for operating a washing machine appliance in accordance with one embodiment of the present disclosure.

Referring now to FIG. 5, method 200 includes, at step 210, determining that a wash basket of a washing machine appliance is not rotating. In this regard, as will be described in more detail below, method 200 includes comparing still images of an empty wash chamber 126, and it is first desirable to ensure that wash basket 120 is not rotating, e.g., to prevent distortion or blurring of the images obtained by camera assembly 170. According to exemplary embodiments, the step of determining that the wash basket is not rotating may include obtaining a basket speed of the wash basket, e.g., using basket speed sensor 186. According still other embodiments, controller 166 may obtain the basket speed by analyzing the motor frequency, the back electromotive force experienced by the motor assembly, or in any other suitable manner. According to still other embodiments, motor 122 may simply be turned off and controller 166 may wait a sufficient amount of time to ensure that wash basket 120 has stopped rotating.

Step 220 includes obtaining one or more images of the wash chamber using the camera assembly. Thus, step 220 includes obtaining one image, a series of images/frames, or a video of wash chamber 126. Step 220 may further include taking a still image from the video clip or otherwise obtaining a still representation or photo from the video clip. It should be appreciated that the images obtained by camera assembly 170 may vary in number, frequency, angle, resolution, detail, etc. in order to improve the clarity of the wash chamber 126. In addition, according to exemplary embodiments, controller 166 may be configured for illuminating the tub using tub light 184 just prior to obtaining images. In this manner, by ensuring wash chamber 126 is well illuminated and not rotating, camera assembly 170 should be capable of obtaining a clear image of wash chamber 126, e.g., assuming lens 182 is not dirty or contaminated (as will be described in more detail below).

Step 230 includes determining that the wash basket is empty. In this regard, the image obtained at step 220 may be used by controller 166 for analyzing the condition of the wash chamber 126 and determining that there are no clothes or other items present within wash chamber 126. It should be appreciated that any suitable image processing or recognition method may be used to determine that wash chamber 126 is empty. In addition, it should be appreciated that this image analysis or processing may be performed locally (e.g., by controller 166) or remotely (e.g., by a remote server 196).

According to exemplary embodiments of the present subject matter, step 230 of determining that the wash basket is empty may include analyzing the image of the wash chamber using a neural network classification module and/or a machine learning image recognition process. In this regard, for example, controller 166 may be programmed to implement the machine learning image recognition process that includes a neural network trained with a plurality of images of empty baskets and baskets containing articles of clothing. By analyzing the image obtained at step 220 using this machine learning image recognition process, controller 166 may determine whether wash basket 120 is empty.

As used herein, the terms image recognition process and similar terms may be used generally to refer to any suitable method of observation, analysis, image decomposition, feature extraction, image classification, etc. of one or more images or videos taken within a wash chamber of a washing machine appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 170 and controller 166 may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object, such as a particular garment or region of a load of clothes. In this regard, a "region proposal" may be regions in an image that could belong to a particular object, such as a particular article of clothing or the wash basket. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 230 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to analyze the image determine whether any articles of clothing are present within wash basket 120. In addition, a K-means algorithm may be used. Other image recognition processes are possible and within the scope of the present subject matter.

It should be appreciated that any other suitable image recognition process may be used while remaining within the scope of the present subject matter. For example, step 230 may include using a deep belief network ("DBN") image recognition process. A DBN image recognition process may generally include stacking many individual unsupervised networks that use each network's hidden layer as the input for the next layer. According to still other embodiments, step 220 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

Step 240 generally includes analyzing the image using an autoencoder neural network process to determine an image quality. In general, the autoencoder neural network may be used to analyze the image obtained at step 220 of the empty, non-rotating wash basket 120. Although step 240 is described herein as using an autoencoder neural network, it should be appreciated that other artificial intelligence and machine learning techniques may be used separately or in conjunction with the autoencoder neural network in order to obtain an image quality of the image obtained at step 220.

As used herein, the terms "autoencoder," "neural network process," "reconstruction technique," and the like are generally intended to refer to any artificial intelligence process intended to detect image quality obtained by a camera assembly. In this regard, for example, an autoencoder process may be an unsupervised neural network learning technique that implements a bottleneck in the network that compresses knowledge or data with respect to one or more images. In this regard, for example, the one or more images obtained of the wash chamber by the camera assembly may be an input to a neural network structure where the image data is compressed to generate a hidden layer or bottleneck, and is then reconstructed to form an output layer, i.e., the reconstructed image or images. Notably, the bottleneck may act to constrain the information that traverses the full network, forcing a learned compression of the input data.

During such a reconstruction process, the autoencoder neural network may be trained to minimize a reconstruction error. In this regard, the reconstruction error represents the difference between the reconstructed images from the autoencoder neural network and a baseline image, e.g., the image originally fed into the autoencoder neural network. Notably, the bottleneck or hidden layers of the autoencoder process limit the amount of information that can flow through the network. In this regard, for example, the input data is encoded into a compressed data set, e.g., a compressed image. The autoencoder neural network then decodes the data during the reconstruction process (e.g., to generate a reconstructed image), and because the network is attempting to minimize a reconstruction error during this decoding process, the model can learn the most important attributes of the input data and determine the best means for reconstructing that data into the output from the bottleneck or the encoded state. Although an exemplary autoencoder process is described herein, it should be appreciated that other variations, processing techniques, artificial intelligence or machine learning models, and other variations may be made to these methods while remaining within the scope of the present subject matter. Indeed, any method of training a neural network by reconstructing an input image to generate an output or reconstructed image that is a close to the input image as possible while passing through some sort of information bottleneck may be used.

This autoencoder neural network may be implemented to capture useful information regarding the image quality of images obtained by camera assembly 170. In this regard, for example, camera assembly 170 may take image of the wash chamber when first installed or when the camera lens is known to be clean and the resulting images are not degraded in any manner. By comparing this original image to the reconstructed image, a reconstruction error value may be obtained. In general, a larger reconstruction error indicates a more degraded image, e.g., due to build-up or fouling of the lens, or due to any other wear on camera assembly 170 which results in degraded image quality. As explained in more detail below, a certain level of reconstruction error may be permitted, but an error above a certain amount may indicate that the obtained images are no longer useful for obtaining useful knowledge regarding the operation of the washing machine appliance. In this case, it may be desirable to notify a user that the lens should be cleaned or the camera assembly should be repaired or recalibrated.

Step 250 includes determining that the image quality has dropped below a quality threshold. As explained above, the autoencoder neural network is generally configured for performing an image reconstruction using the image obtained at step 220, obtaining a reconstruction error based on a comparison of the reconstructed image to the image of the wash chamber. In general, this reconstruction error may correspond to or be representative of the image quality obtained by camera assembly 170. As a result, controller 166 can determine when the image quality of camera assembly 170 has been degraded to a point when corrective action should be taken. In this regard, for example, controller 166 may be programmed with the predetermined reconstruction error threshold. When the reconstruction error exceeds the predetermined error threshold, controller 166 may deduce that the image quality is degraded below a quality threshold, and corrective action should be implemented. It should be appreciated that the image quality threshold and/or the reconstruction error threshold may be determined or programmed in any suitable manner and may be any suitable value depending on the particular application.

Step 260 includes implementing a responsive action in response to determining that the image quality has dropped below the quality threshold, e.g., that the reconstruction error has exceeded the reconstruction error threshold. According to exemplary embodiments, step 260 of implementing a responsive action may include adjusting at least one operating parameter of the washing machine appliance based on the image quality determination. As used herein, an "operating parameter" of washing machine appliance 100 is any cycle setting, operating time, component setting, spin speed, part configuration, water level, water temperature, detergent volume, or other operating characteristic that may affect the performance of washing machine appliance 100.

Thus, references to operating parameter adjustments or "adjusting at least one operating parameter" are intended to refer to control actions intended to improve system performance based on the image quality determination.

For example, controller 166 may be configured for obtaining a reconstruction error threshold, i.e., a threshold beyond which control algorithms that rely on images obtained by camera assembly 170 may falter or result in poor performance of washing machine appliance 100. Once this threshold is reached and the image quality obtained by camera assembly 170 can no longer provide useful data to the control algorithms regulating washing machine appliance 100, controller 166 may prevent further operation of washing machine appliance or may operate washing machine appliance independent of camera assembly 170, e.g., by preventing further use of camera assembly 170 until the image quality is greater than the quality threshold (e.g., until lens 182 is cleaned and/or camera assembly 170 provides improved image quality). Other operating parameter adjustments are possible and within the scope of the present subject matter.

In addition, adjusting the at least one operating parameter may include providing a user notification, e.g., via a user interface or control panel 160, in the event that the image quality has dropped below the quality threshold. For example, if controller determines 166 that the reconstruction error exceeds the reconstruction error threshold, and thus concludes that the image quality has dropped below the image quality threshold, step 260 may include providing a user notification through control panel 160 so that the user may take corrective action. In addition, or alternatively, controller 166 may be configured to provide a user notification to a remote device, such as remote device 194 via a network 192. Whether provided via control panel 160, remote device 194, or by other means, this user notification may include useful data regarding the operation of camera assembly 170, such as the image quality, a notification that the image quality has dropped below a certain threshold, user instructions regarding cleaning camera assembly 170, or other useful information.

Figure 6:
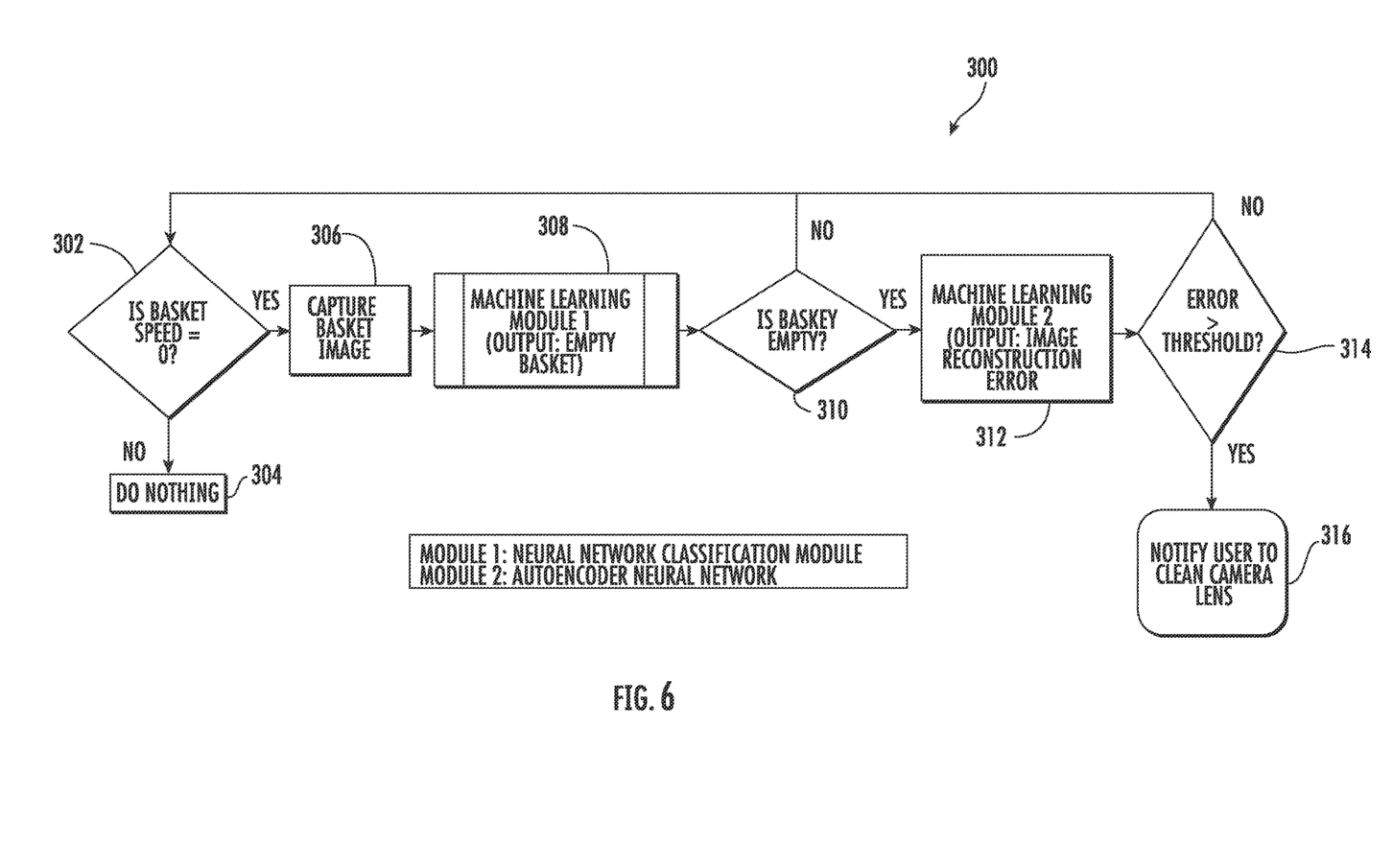
FIG. 6 provides a flow diagram illustrating an exemplary process for implementing a lens cleaning method according to an exemplary embodiment of the present subject matter.

Referring now briefly to FIG. 6, an exemplary flow diagram of an image quality determination method 300 that may be implemented by washing machine appliance 100 will be described according to an exemplary embodiment of the present subject matter. According to exemplary embodiments, method 300 may be similar to or interchangeable with method 200 and may be implemented by controller 166 of washing machine appliance 100. As shown, at step 302, controller 166 may first determine whether wash basket 120 is rotating (e.g., using basket speed sensor 186). If the basket speed is nonzero (i.e., the basket is still rotating) step 304 may include doing nothing or otherwise waiting until the basket speed drops to zero. If at step 302 the basket speed is determined to be zero, step 306 may include capturing an image of the basket, e.g., using camera assembly 170.

As explained above, because clothes within wash chamber 126 may negatively affect the ability of the present methods to determine image quality, step 308 may include passing the image obtained at step 306 through a first machine learning module (e.g., a neural network classification module) that outputs whether wash basket 120 is empty or not. Step 310 includes determining whether the basket is empty, e.g., based on output from the first machine learning module. If the basket is not empty, the detection process cycles back to step 302 and continues until the basket is empty. If at step 310 the basket is determined to be empty, the same image obtained at step 306 is passed into a second machine learning module at step 312, e.g., an autoencoder neural network. As displayed above, the autoencoder neural network is generally configured for encoding/compressing the image through a bottleneck and then decoding/decompressing the image such that a reconstruction error is minimized.

Step 314 includes comparing the reconstruction error to a reconstruction error threshold. As explained above, the reconstruction error may generally be associated with image quality and the reconstruction error threshold may be specified by a user or by the manufacturer as being associated with a minimal image quality necessary to perform useful methods using camera assembly 170. At step 314, if the reconstruction error remains below the reconstruction error threshold (e.g., the image quality remains above the image quality threshold), the method continues at step 302. By contrast, if step 314 concludes that the reconstruction error is greater than the reconstruction error threshold, step 316 may include implementing corrective action, e.g., by notifying a user to clean the camera lens.

FIGS. 5 and 6 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 and method 300 are explained using washing machine appliance 100 as an example, it should be appreciated that this method may be applied to the operation of any suitable laundry appliance, such as another washing machine appliance or a dryer appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry appliance comprising:
   a basket rotatably mounted within the cabinet and defining a chamber configured for receiving of a load of clothes;
   a motor operably coupled to the basket for selectively rotating the basket;
   a camera assembly mounted within the cabinet in view of the chamber; and
   a controller operably coupled to the camera assembly, the controller being configured to:
      determine that the basket is not rotating by monitoring operation of the motor or a basket speed sensor;
      obtain an image of the chamber using the camera assembly;
      determine that the basket is empty by analyzing the image;
      analyze the image using an autoencoder neural network process programmed on the controller to determine an image quality, the analysis comprising performing an image reconstruction using the image of the chamber and the autoencoder neural network process and obtaining a reconstruction error based on a comparison of the reconstructed image to the image of the chamber;
      determine that the image quality has dropped below a quality threshold based on the reconstruction error generated by the autoencoder neural network process; and
      implement a responsive action in response to determining that the image quality has dropped below the quality threshold.

2. The laundry appliance of claim 1, wherein performing the image reconstruction comprises:
   encoding the image of the chamber to obtain a compressed image; and
   decoding the compressed image to obtain a reconstructed image.

3. The laundry appliance of claim 1, wherein determining that the image quality has dropped below the quality threshold comprises:
   determining that the reconstruction error is greater than a predetermined error threshold.

4. The laundry appliance of claim 1, wherein determining that the basket is empty comprises:
   analyzing the image of the chamber using a machine learning image recognition process to determine that the basket is empty.

5. The laundry appliance of claim 4, wherein the machine learning image recognition process comprises at least one of a convolution neural network ("CNN"), a region-based convolution neural network ("R-CNN"), a deep belief network ("DBN"), or a deep neural network ("DNN") image recognition process.

6. The laundry appliance of claim 1, wherein implementing the responsive action comprises:
   preventing further use of the camera assembly until the image quality is greater than the quality threshold.

7. The laundry appliance of claim 1, wherein implementing the responsive action comprises:
   providing a user with instructions to clean a lens of the camera assembly.

8. The laundry appliance of claim 1, wherein the laundry appliance further comprises:
   a user interface panel, wherein the controller is further configured to provide a user notification through the user interface panel when the image quality has dropped below the quality threshold.

9. The laundry appliance of claim 1, wherein the controller is in operative communication with a remote device through an external network, and wherein the controller is configured to provide a user notification to the remote device when the image quality has dropped below the quality threshold.

10. The laundry appliance of claim 1, further comprising:
    a tub light for illuminating the chamber, wherein the controller is further configured to turn on the tub light prior to obtaining the image of the chamber.

11. The laundry appliance of claim 1, further comprising:
    a door rotatably mounted to the cabinet for providing selective access to the chamber; and
    a gasket positioned between wherein the door and the cabinet, wherein the camera assembly is mounted in the gasket or on an inner surface of the door.

* * * * *